United States Patent [19]
Griffin

[11] Patent Number: 5,213,219
[45] Date of Patent: May 25, 1993

[54] CROP CLEANER AND SEPARATOR

[76] Inventor: Horace D. Griffin, 7704 Whaleyville Blvd., Suffork, Va. 23438

[21] Appl. No.: 690,557

[22] Filed: Apr. 24, 1991

[51] Int. Cl.⁵ .............................................. B07B 1/10
[52] U.S. Cl. ................................. 209/307; 209/470; 209/665
[58] Field of Search .............. 209/21, 307, 308, 665, 209/673, 676, 394

[56] References Cited

U.S. PATENT DOCUMENTS

| | | | |
|---|---|---|---|
| 1,868,356 | 7/1932 | Helenbolt | 209/307 X |
| 2,139,380 | 12/1938 | Norris | 209/307 X |
| 2,303,984 | 12/1942 | Byers | 209/307 X |
| 2,367,964 | 1/1945 | Ross | 209/307 |
| 3,280,977 | 10/1966 | Looker | 209/307 |
| 3,698,552 | 10/1972 | Wittmann | 209/665 |
| 4,075,088 | 2/1978 | McRae et al. | 209/307 X |
| 4,515,276 | 5/1985 | Feller et al. | 209/470 X |
| 4,787,461 | 11/1988 | Rogus | 209/308 X |

FOREIGN PATENT DOCUMENTS

| | | | |
|---|---|---|---|
| 2157852 | 5/1973 | Fed. Rep. of Germany | 209/665 |
| 2429322 | 1/1975 | Fed. Rep. of Germany | 209/673 |
| 0456567 | 6/1975 | U.S.S.R. | 209/665 |

*Primary Examiner*—Robert P. Olszewski
*Assistant Examiner*—James R. Bidwell
*Attorney, Agent, or Firm*—Robert W. Carlson

[57] ABSTRACT

The invention comprises a machine for cleaning various crops such as peanuts and separating debris therefrom which may be easily transported to the field when such crops are harvested. The machine includes a unique conveyor which is formed of spaced rods mounted on endless chains in a manner so that the spaces may be selectively varied. The conveyor is vibrated as it carries the crop and debris from a feeding hopper to a discharge chute.

6 Claims, 2 Drawing Sheets

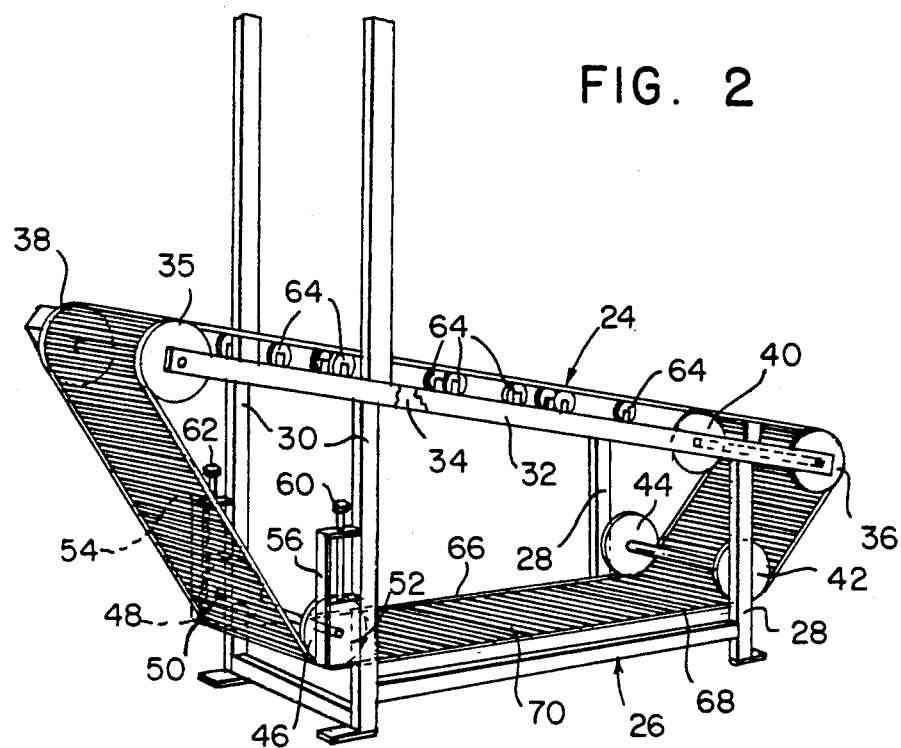
FIG. 2
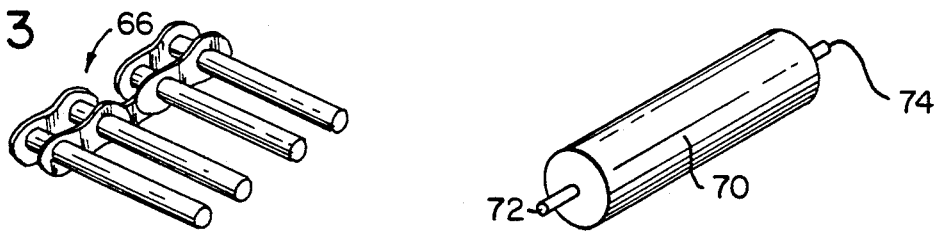
FIG. 3
FIG. 4
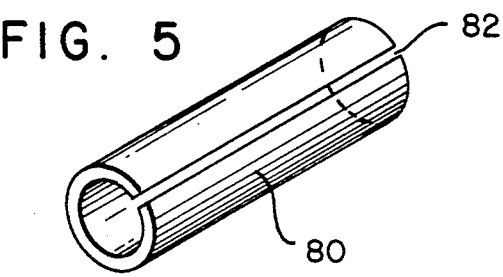
FIG. 5

CROP CLEANER AND SEPARATOR

BACKGROUND OF THE INVENTION

Harvesting peanuts, potatoes and the like has been a slow and tedious procedure for many years. The crops must be removed from beneath the surface of the ground and collected for transporting from the fields. In the past, such crops were plowed up to the surface of the ground and thereafter raked from the surface and deposited into collection bins.

Many improvements have been made by providing apparatus which, when moved along the surface of the ground, are adapted to dig up the crops and convey them to collection means in a combined operation. Such apparatus often includes means for separating dirt which clings to the crops from the crops as they are conveyed to the collection means as well as separating debris picked up from the surface of the ground before the crops are deposited in the collection means.

The most common method of separation is is by utilizing an endless conveyor of spaced apart rods to deliver the crops from the digging means to the collection means whereby the debris drops through the space between the rods. Typical of such apparatus is that shown by Looker U.S. Pat. No. 3,280,977.

Rogus U.S. Pat. No. 4,787,461 discloses an improvement for such machines comprised of means to agitate the conveyor to facilitate separation of dirt from the crops.

In some instances it has been found desirable to provide air blowers to remove light materials from the conveyor such as disclosed by Feller U.S. Pat. No. 4,515,276.

The present invention is an improvement over such a prior art devices. Due to the very nature of the materials handled by the machines, wear on the various parts is a large problem, particularly with the conveyor.

It is desirable that the spacing between the rods can be varied as desired to handle different variety of crops.

THE DRAWINGS

FIG. 2 is a perspective view of the conveyor and its supporting structure,

FIG. 3 is an enlarged view of a portion of the conveyor,

FIG. 4 is a perspective view of a single conveyor rod; and

FIG. 5 is a perspective view of the tubing used to cover the conveyor rods.

THE INVENTION

Figure 1:
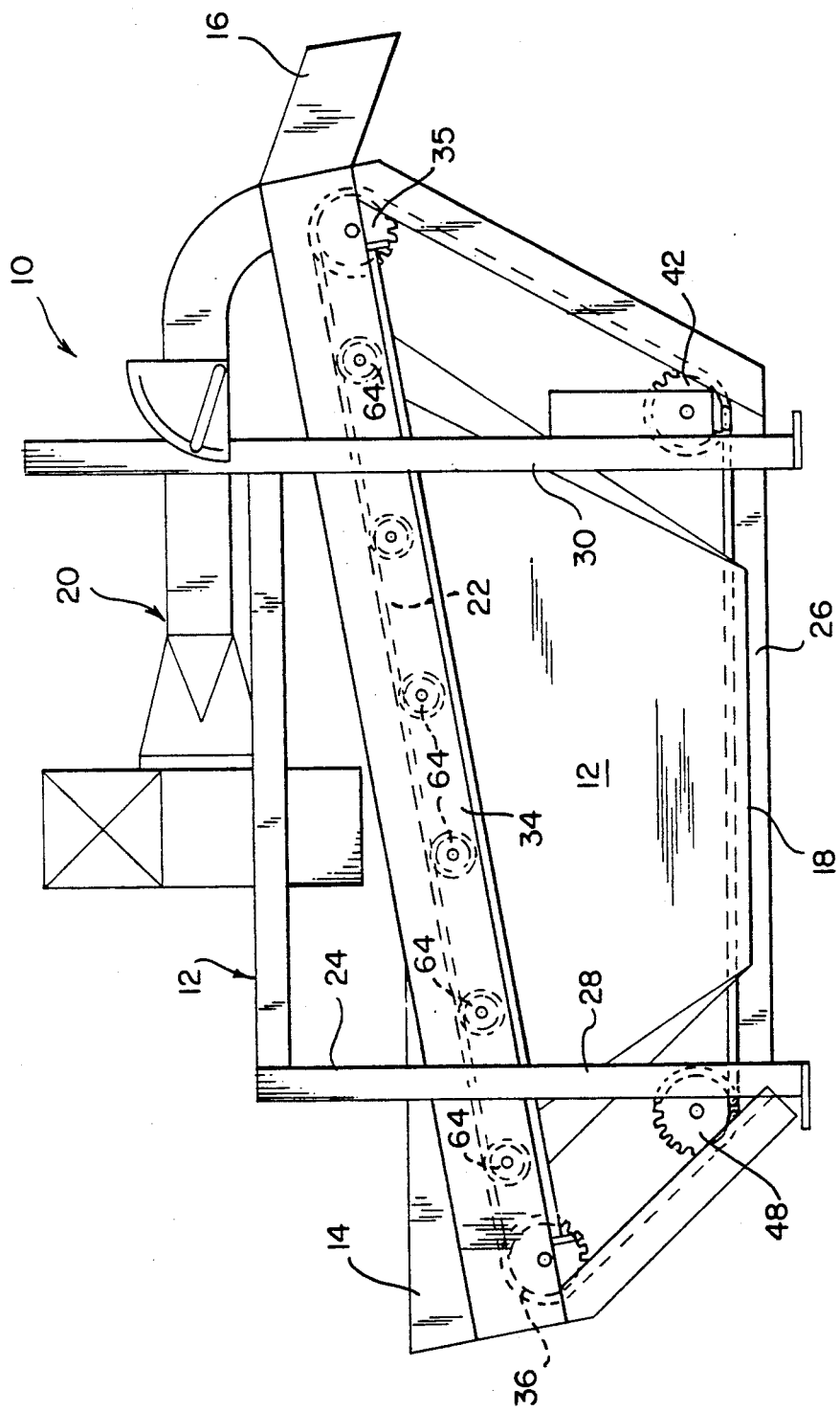
FIG. 1 is a perspective view of the machine.

The crop cleaner 10 comprises a housing 12 having a feed hooper 14 at its one end and a discharge chute 16 at the other end. The bottom of the housing 12 is provided with an opening 18 through which debris separated from the crop is deposited on the ground.

A blower (not shown) is mounted in an enclosure 20 supported on top of the housing 12 adjacent the discharge chute 16. Suitable drive means for the blower is also mounted in the enclosure 20. This will assist in removing the lighter debris.

A conveyor 22, enclosed within the housing 12, is mounted in an inclined position on a frame 24. The conveyor 22 is positioned with its lower end beneath the feed hopper 14 to receive crops and debris. As the crops and debris are carried up the incline, the debris falls through openings in the conveyor and the crops remain on the conveyor until it is dumped therefrom at the upper end of the path of the conveyor.

The wear on the conveyors used in machines of this type is great and results in time consuming and expensive repairs. Many attempts have been made to provide conveyors to overcome these problems. The conveyor of this invention has been found to reduce greatly the wear incurred during its use. The construction of the conveyor of this invention also permits fast and easy replacement of a single rod of the conveyor.

The conveyor frame 24 comprises a rectangular base 26 formed of metal channel bars or other suitable materials. The frame 24 is provided with a pair of uprights 28 at one end and an additional pair of uprights 30 at its other end. The uprights 28 are of equal height but considerably shorter than the uprights 30, which also are of equal height.

A pair of beam 32 and 34 are secured to the upper ends of the uprights in an inclined relation to the base 26.

The beams 32 and 34 are of such a length so as to extend beyond the uprights 28 and 30. The beam 32 has sprockets 35 and 36 rotatably mounted on each end thereof and the beam 34 is similarly provided with rotatable sprockets 38 and 40. The uprights 28 have sprockets 42 and 44 rotatably mounted thereon adjacent their lower ends.

Sprockets 46 and 48 are rotatably mounted on blocks 50 and 52 supported on the uprights 30. The blocks 50 and 52 are slidably mounted between vertical frame elements 54, 56 and the adjacent upright 30.

The endless conveyor 22 is mounted on the sprockets 35, 36, 38 and 40. Screws 60 and 62 attached to the blocks 50 and 52 are provided to adjust the tension of the conveyor by sliding the blocks either in an upwardly or downwardly direction.

A plurality of stationary sprockets 64 are mounted on the beams 32 and 34 spaced along the lengths thereof. As the conveyor 22 is driven about its path, it will engage several of the teeth of the sprockets and will be jarred as its passes over the sprockets. The jarring will separate any debris that is clinging to the crops. In the event the teeth of the sprockets which engage the conveyor become worn, the sprockets 64 may be loosened on their supporting brackets and be rotated until new teeth are in position to engage the conveyor.

The conveyor 22 consists of a pair of link chains 66 and 68 having a plurality of bars 70 extending therebetween. The bars 70 are formed of solid metal stock having reduced end portions forming pins 72 and 74 which are supported in holes in the chains. The holes 76 and 78 are slightly larger than the pins 72 and 74 so that the bars 70 may rotated as the conveyor 22 is driven along its path. This feature reduces the wear on the bars 70.

The spacing between the bars 70 depends on the pitch of the chains 66 and 68 and therefore may be varied by using chains of various pitches as desired. The spacing of the bars 70 may be also varied by use of plastic bar covers 80. The plastic covers 80 are provided in various thicknesses and are sufficiently pliable so that may be attached to the bars 70 without removing the bars from the chains. The covers 80 are opened along the slits 82 and placed on the bars 70. The additional thickness of the covers thereby reduces the spacing between the bars 70.

A suitable motor, not shown, is used to drive the conveyor 22.

I claim:

1. Apparatus for separating debris from food products comprising a housing having a loading hopper, an unloading chute, and an opening for discharge debris, a frame mounted in said housing, a plurality of sprockets mounted on said frame, an endless conveyor supported on said sprockets in an inclined position extending from below said hopper to a position above said unloading chute; said conveyor comprising a pair of endless chains, a plurality of rods extending laterally between said endless chains and supported thereby, means for driving said conveyor, said rods being supported on said endless chains in spaced relationship to form openings there between, a plurality of sleeves adapted to cover said rods so as to vary the size of the openings between said rods, said sleeves being formed of plastic tubing with a slit along the length thereof to facilitate placing the sleeves on said rods.

2. Apparatus as set forth in claim 1 wherein said rods have pins at each end thereof, and said pins being loosely supported in openings in said chains so that said rods will rotate as said conveyor moves along its path.

3. Apparatus as set forth in claim 1, including a plurality of stationary sprockets supported on said frame in the path of the conveyor.

4. Apparatus as set forth in claim 3 wherein said conveyor is vibrated as its travels over said stationary sprockets.

5. Apparatus as set forth in claim 1 including a blower in said housing to assist in removing light debris.

6. Apparatus as set forth in claim 1 including means mounted on said frame for adjusting the tension of said endless conveyor.

* * * * *